March 13, 1962 M. N. FIX 3,024,641

METHOD AND APPARATUS FOR MEASURING TRANSIENT PRESSURES

Filed Aug. 30, 1957

INVENTOR.
MARY N. FIX
BY
ATTYS

United States Patent Office 3,024,641
Patented Mar. 13, 1962

3,024,641
METHOD AND APPARATUS FOR MEASURING TRANSIENT PRESSURES
Mary N. Fix, Albuquerque, N. Mex., assignor to the United States of America as represented by the Secretary of the Navy
Filed Aug. 30, 1957, Ser. No. 681,421
9 Claims. (Cl. 73—35)
(Granted under Title 35, U.S. Code (1952), sec. 266)

The invention described herein may be manufactured and used by or for the Government of the United States of America for governmental purposes without the payment of any royalties thereon or therefor.

This application relates to a pressure responsive E.M.F. producing and pressure measuring device and to a method of measuring transient pressures; more particularly the instant invention is concerned with a non-oriented dielectric, voltage producing element possessing an instantaneous E.M.F. output characteristic which is proportional to the instantaneous pressure level during loading of the element. The invention is well suited for measuring both ultrahigh or ultralow pressures, as the case may be.

Heretofore, it has been the practice to utilize various types of gages to measure instantaneous pressures. But no gage previously available was capable of directly measuring the extremely high pressures encountered in the detonation of high explosives. Therefore, in the ultrahigh range of pressures created by explosions it has been the practice to determine the pressures indirectly by measuring translational velocities and calculating the pressures by employing the known physical relation between pressures and the translational velocities. This indirect method is extremely complex, expensive, and requires several months to complete.

Accordingly, it is an object of this invention to provide a device for directly measuring ultra high pressures.

Another object is to provide a pressure sensitive E.M.F. producing device which may be utilized to measure static or dynamic pressures.

A further object of the invention is to provide a device for measuring pressure variations over extremely short time intervals which is capable of measuring the shape of transient pressure pulses.

Still another object is the provision of a pressure responsive device which functions in a manner dependent upon its orientation with respect to the direction of the applied pressure and which generates a quantity of charge proportional to the applied pressure.

An even further object is to provide a pressure sensitive E.M.F. producing element which includes a dielectric sheet having a ground foil at one face thereof and a signal foil at another face and provided with a backing plate of acoustic impedance similar to that of the dielectric sheet.

A still further object is to provide a non-oriented E.M.F. producing pressure gage which is proportionally and instantaneously responsive to magnitude of the applied pressure.

Yet another object of this invention is to provide a pressure responsive device including a pair of electrically conducting portions separated by a pressure sensitive dielectric element which device produces a potential difference proportional to the applied pressure between the conducting portions.

Still another object of this invention is the provision of a new and improved method of producing an E.M.F. in response to transient pressures, which E.M.F. is proportional to the instantaneous magnitude and direction of the transient pressures.

A still further object of this invention is the provision of a new and improved method and apparatus for the direct measurement of pressure transients in the body of an explosive charge as the charge is detonated.

These and many other objects will become apparent when the following specification is read in conjunction with the attendant drawing wherein like numerals designate like parts throughout and in which.

Figure 1:
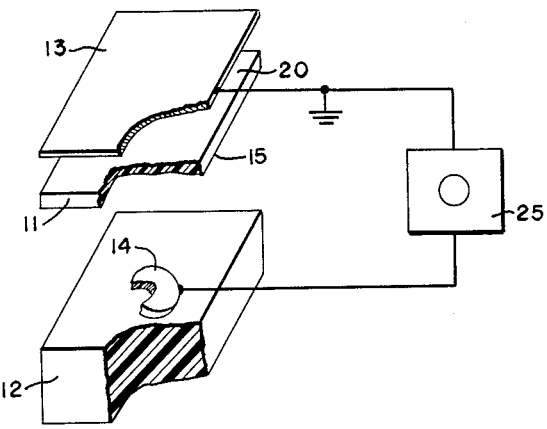
FIG. 1 is an exploded perspective view partly broken away of a typical gage.

As is apparent from FIG. 1, the gage of this invention consists of a dielectric element 11 supported at its rear surface 15 by a relatively massive backing plate 12, which plate is advantageously composed of a material which is acoustically similar to the material of element 11. This prevents attenuation of the pressure generated compression wave within element 11 by eliminating a free boundary at the rear surface 15 from which a rarefaction wave might originate and be propagated back into element 11 as the element unloads from surface 15. An electrically conducting, grounded foil or plate 13 is disposed contiguous to the front face of element 11 to provide one electrical output terminal. If 13 takes the form of a thick plate, it may serve also as a "driver" to uniformly load the front surface 20 of element 11 when it is subjected to sudden pressures. On the reverse face 15 of element 11 is disposed a signal foil 14 which need only cover a portion of the rear surface of the element as shown in FIG. 1.

When pressure is applied to surface 20 a compressional wave is propagated through element 11, which wave ultimately passes into the backing plate 12 and to the surroundings. An unbalance of electrical charge between front surface 20 of element 11 and its rear surface 15 is produced by the applied pressure, this unbalance of charge results in a difference in potential between foils 13 and 14 proportional to the applied pressure.

When the gage is employed to measure a rapidly changing transient pressure, the foil 13 on the impact face 20 of the dielectric is electrically grounded while the signal foil 14 on surface 15 is connected to the input of a high speed oscilloscope indicated generally at 25 through a suitable impedance matching circuit [not shown] so that the rise and decay of transient pressures may be observed. If a permanent record of the pressure profile is desired, the screen of the scope 25 may be photographed.

Apparently two distinct phenomena may take place within element 11 depending upon the type of pressure to which this element is subjected. If the compression of the dielectric 11 at the foil interfaces is asymmetric one type of phenomena results. As used in this specification an asymmetrical compression of element 11 results when this element is subjected to a pressure so that a compressional wave originates at one surface and travels through the element to the opposite surface. When the dielectric is so compressed, a response is obtained during the transient time of the compression wave through element 11. In this type of phenomena, the duration of the generated voltage is proportional to the thickness of element 11 which is of course a measure of the travel time of the shock wave through the element. On the other hand, if element 11 is uniformly compressed at both surfaces as by a mechanical press, an E.M.F. is generated which is much smaller than the E.M.F. observed when element 11 is asymmetrically loaded.

Various theories have been advanced to explain the above phenomena, but no theory proposed satisfactorily explains both of the aforementioned voltage characteristics of the dielectric. Accordingly, it is not definitely known why this gage behaves as it does. However, it has been demonstrated that piezo electricity is not responsible since piezoelectric crystals exhibit a definite polarity between their respective faces. That is to say, when a piezoelectric crystal is stressed, it produces an output between its faces in such a manner that the polarity of one face is always positive with respect to the other and this polarity remains regardless of the direction in which the crystal is stressed. But, in the gage of the instant invention, the relative polarity of the faces 15 and 20 depends upon the direction of an applied asymmetric shock; if the orientation of the element 11 is reversed with respect to the applied pressure, the polarity of the output changes.

Thus element 11 possesses several inherent advantages over a piezoelectric type crystal in that it can be formed in a variety of sizes and shapes, it produces reliable output at ultra high pressures, and requires no special treatment to make it suitable for use as a gage. Furthermore, dielectric 11 is much less expensive than a piezoelectric crystal.

It has been determined that element 11 may be any non-oriented dielectric, not necessarily a solid. Examples of compositions that have been found to be successful for this purpose are: "Plexiglas," "polystyrene," "Saran," cast TNT, nitrobenzene, oleic acid, distilled water, "methaflex," cellulose acetate, "Scotch tape," rubber, and paper, all of which may vary in thickness from a few thousandths of an inch up to about ½ inch. Of course, when a liquid is used as a gage element 11 the physical arrangement of the device must be altered.

Figure 2:
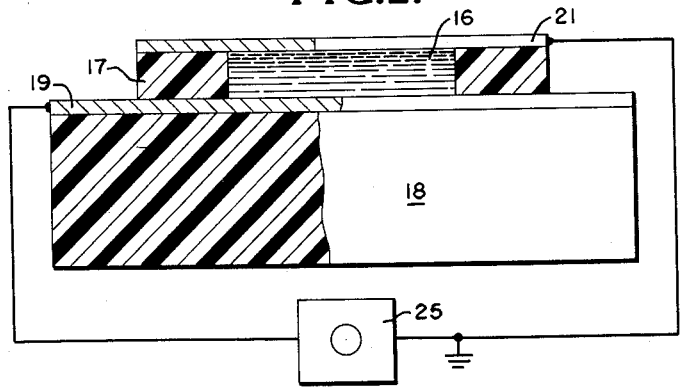
FIG. 2 is a longitudinal section of a typical gage wherein the dielectric is a liquid.

FIG. 2 shows a device wherein the gage element is a dielectric liquid 16 confined within the central portion of a spacer washer 17 which rests upon a backup plate 18 supporting the liquid 16. Plate 18 is coated with a conductive signal foil 19 in electrical contact with liquid 16, while a ground foil 21 is disposed over the central opening in washer 17 on the side remote from foil 19. Of course, foil 21 also must be in electrical contact with element 16. In operation this gage functions in a manner similar to the gage of FIG. 1.

Figure 3:
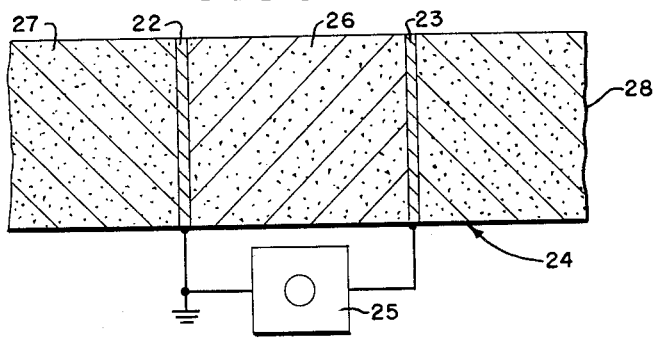
FIG. 3 is a modified gage suitable for measuring pressure variations within the body of an explosive during detonation.

If it is desired to record the pressures within an explosive charge, a pair of foils may be included in the body of the explosive. As shown in FIG. 3, a pair of metal foils 22 and 23 are disposed within a slug of explosive 24 so as to define a dielectric gage portion 26 and a backing portion 27 composed of the explosive material itself. When the explosive is ignited at end 28, the shock wave produced generates an E.M.F. between foils 22 and 23 as it passes through that portion of the explosive slug 26 disposed therebetween. These foils 22 and 23 are extremely thin and consequentially do not affect the explosion shock wave characteristic in the slug 24.

Although this invention is shown in but a few embodiments, it should be apparent to one skilled in the art that it is not so limited but is susceptible of many modifications without departing from the spirit thereof. Therefore, this specification is not to be construed as limiting the invention in any manner and the scope of the invention is to be determined by the scope of the appended claims.

What is claimed as new and desired to be secured by Letters Patent of the United States is:

1. A pressure responsive gage for measuring the profile of a transient pressure valve in a medium caused by a high velocity impact and comprising; a dielectric having a composition which displays non-oriented E.M.F. producing characteristics, said dielectric being disposed in said medium and positioned with respect to said pressure wave in such a manner as to receive the transient pressure wave at one surface thereof, a first electrically conducting member disposed in abutting relation to the pressure receiving surface of said dielectric, a second electrically conducting member disposed in abutting relation to said dielectric and remote from said first electrically conducting member for deriving an E.M.F. between said first electrically conducting member and said second electrically conducting member when said dielectric is subjected to a transient pressure wave, and means to record said E.M.F. as an indication of the profile of said pressure wave.

2. The pressure responsive gage of claim 1 wherein the medium is defined by an explosive compact and the dielectric is defined by an internal portion thereof, and wherein said electrically conducting members are embedded in said compact on opposite sides of the internal portion.

3. The gage of claim 1 further including a massive support block having acoustic characteristics similar to the acoustic characteristics of said dielectric and disposed in abutting relation to said second electrically conducting member and in supporting relation to said dielectric.

4. The gage of claim 1 wherein the dielectric is a liquid.

5. The gage of claim 1 wherein said second electrically conducting member is substantially smaller in area than said first electrically conducting member.

6. The method of directly measuring ultra high transient pressure formed within the body of an explosive during detonation which comprises; disposing a pair of electrically conducting foils in mutually spaced relation within said explosive thereby to define an explosive dielectric portion therebetween, initiating the detonation of said explosive externally of said portion, thereby to generate an E.M.F. between said foils as a measure of said transient pressure.

7. The method of directly measuring transient pressure profiles formed within a body of an explosive material during detonation which comprises; disposing a pair of spaced apart electrically conducting foils within said explosive and intermediate its ends to define an explosive pressure measuring dielectric portion between the foils and an explosive support portion adjacent to said explosive pressure measuring portion, detonating the body of the explosive at a point remote from said explosive portions, and measuring an E.M.F. generated between said foils upon passage of the explosive shock wave through said explosive pressure measuring portion as an indication of said pressure profile.

8. The method of measuring the profile of a transient pressure wave through a medium comprising placing within said medium a dielectric having non-oriented E.M.F. producing characteristics, positioning a first electrically conducting element on the pressure receiving side of said dielectric and in abutting relation therewith, positioning a second electrically conducting element on the opposite side of said dielectric from said first element and in abutting relation with said opposite side, applying a transient pressure to said medium to derive an output E.M.F. between said pair of conducting elements, and recording said output E.M.F. as an indication of the profile of the transient pressure wave.

9. The method of measuring the profile of a transient pressure wave through a medium comprising placing within said medium a dielectric having non-oriented E.M.F. producing characteristics, positioning a first electrically conducting element on the pressure receiving side of said dielectric and in abutting relation therewith, positioning a second electrically conducting element on the opposite side of said dielectric from said first element and in abutting relation with said opposite side, supporting said dielectric on said opposite side by a material having acoustic properties similar to said dielectric, applying the transient pressure to said medium to derive an output E.M.F. between said pair of conducting elements, and recording said output E.M.F. as an indication of the profile of the transient pressure wave.

References Cited in the file of this patent

UNITED STATES PATENTS

| | | |
|---|---|---|
| 2,451,908 | Blau | Oct. 19, 1948 |
| 2,569,987 | Frondel | Oct. 2, 1951 |
| 2,614,416 | Hollmann | Oct. 21, 1952 |
| 2,725,548 | Harris | Nov. 29, 1955 |